United States Patent [19]

Tomagou et al.

[11] Patent Number: 4,958,003
[45] Date of Patent: Sep. 18, 1990

[54] AROMATIC SULFIDEAMIDE POLYMER AND METHOD FOR PRODUCING THE SAME

[75] Inventors: Satoshi Tomagou; Toshikazu Kato; Hiroshi Inoue; Kensuke Ogawara, all of Mie, Japan

[73] Assignee: Tosoh Corporation, Yamaguchi, Japan

[21] Appl. No.: 288,881

[22] Filed: Dec. 23, 1988

[30] Foreign Application Priority Data

Dec. 25, 1987 [JP] Japan .................. 62-327385

[51] Int. Cl.$^5$ .......................... C08G 69/42
[52] U.S. Cl. ...................... 528/364; 528/173; 528/191; 528/206; 528/207; 528/208; 528/210; 528/226; 528/337; 528/387; 528/388; 525/432; 524/404; 524/405; 524/419; 524/424; 524/433; 524/437; 524/444; 524/445; 524/447; 524/449; 524/451; 524/452; 524/454; 524/455; 524/492; 524/495
[58] Field of Search ............ 528/173, 191, 226, 364, 528/206, 207, 208, 210, 337, 388

[56] References Cited

U.S. PATENT DOCUMENTS

| | | | |
|---|---|---|---|
| 2,706,726 | 4/1955 | Evans et al. | 528/364 |
| 3,640,965 | 2/1972 | Brode et al. | 528/364 |
| 4,440,915 | 4/1984 | Asakura et al. | 525/537 |
| 4,621,134 | 11/1986 | Aritomi et al. | 528/179 |
| 4,818,809 | 4/1989 | Ishikawa et al. | 528/364 |

FOREIGN PATENT DOCUMENTS 261988 3/1988 European Pat. Off. .
226528 4/1985 Japan .

Primary Examiner—John Kight, III
Assistant Examiner—Frederick Krass
Attorney, Agent, or Firm—Sughrue, Mion, Zinn, Macpeak & Seas

[57] ABSTRACT

A class of amide group-containing aromatic dihalide compounds are sulfidized together with a class of aromatic dihalide compounds to provide a novel class of aromatic sulfideamide polymers increased in crystalline melting point ($T_m$). The polymers exhibit excellent resistance to high temperatures, resistance to solvents, flame-retardant properties and improved mechanical properties.

5 Claims, 1 Drawing Sheet

AROMATIC SULFIDEAMIDE POLYMER AND METHOD FOR PRODUCING THE SAME

This invention relates to a novel crystalline aromatsulfideamide polymer and a process for production of the novel polymer. The polymers according to the invention have a chemical structure in which phenylene and alkylene groups are alternately bonded via an amide group and a thioether group. The polymers are useful as materials for producing articles exhibiting improved properties such as excellent resistance to high temperatures, flame-retardant properties, resistance to solvents, good mechanical properties, good fabricability, etc.

Polyphenylene sulfide which is a polymeric compound comprising phenylene groups linked to each other via a thioether group is well known in the art. This polymer has such properties as good flame-retardancy, low moisture absorption, high dimensional stability, etc. However, since this type of polymer exhibits a relatively low heat distortion temperature (HDT) of 260° C. (GF 40%; i.e. containing 40% glass fibers) and a crystalline melting point ($T_m$) of 281° C., its usefulness in applications where high resistance to heat is required is inevitably limited. Consequently there has been a demand in the art for the development of polyphenylene sulfide materials having higher crystalline melting points.

A polymer substance containing thioether, phenylene and amide groups in the macromolecular backbone, i.e. a polymer of aromatic polythioether amide, and a process for production thereof are described in Japanese Patent Application Public Disclosure (KOKAI) No. 60-226528. This polymer substance presents some problems in practice because it has a rather low softening point, is soluble in organic solvents such as dimethyl sulfoxide or N-methyl-2-pyrrolidone and exhibits poor resistance to chemicals. Additionally the synthesis of thiol group-containing monomers to be used in the preparation of the polymer is so expensive that production of the polymer is not feasible from the economic viewpoint. It is also possible to synthesize a similar polymer from an amide group-containing aromatic dihalide compound and a sulfidizing agent. However, there are problems, such as that the resulting aromatic sulfideamide polymer itself has a too high melting point to be melt processed in the neat state.

An object of the present invention, therefore, is provide to a novel aromatic sulfideamide polymer substance comprising a commercially available, inexpensive aliphatic moiety in the repeating units and which is improved in terms of resistance to high temperatures, resistance to solvents and mechanical properties, and good fabricability.

A further object of the present invention is to provide a process for production of such a novel polymer substance.

According to one aspect of the present invention, there is provided a novel aromatic sulfideamide polymer compound or compounds which comprise(s) from 1 to 99 mol % of repeating units represented by the following formula (I) and/or (II):

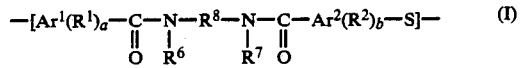
(I)

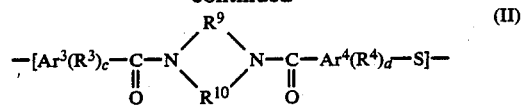
(II)

and from 99 to 1 mol % of repeating units represented by the formula (III):

(III)

wherein $Ar^1$, $Ar^2$, $Ar^3$, $Ar^4$ and $Ar^5$ which may be the same or different, each represent an aromatic ring; $R^1$, $R^2$, $R^3$, $R^4$, $R^5$, $R^6$ and $R^7$, which may be the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of $R^6$ and $R^7$ optionally being hydrogen; a, b, c, d and e, which may be the same or different, each represent an integer of from 0 to 4; and $R^8$, $R^9$ and $R^{10}$, which may be the same or different, each represent an alkylene group having 1 to 20 carbon atoms, said polymer compound or compounds having a logarithmic viscosity [$\eta$] of 0.02 to 2.00, as determined by measuring the relative viscosity of polymer dissolved in a concentrated sulfuric acid solvent at 30° C. and at a polymer concentration of 0.5 g/100 ml or the relative viscosity of polymer dissolved in α-chloronaphthalene at 210° C. and at a polymer concentration of 0.1 g/100 ml and computing the result in accordance with the equation:

$$[\eta] = \ln \frac{(\text{relative viscosity})}{(\text{polymer concentration})}.$$

According to another aspect of the present invention, there is provided a process for production of an aromatic sulfideamide polymer compound or compounds, which comprises sulfidizing an amide group-containing dihalide compound or compounds having the following general formula (IV) and/or (V) and an aromatic dihalide compound of the following formula (VI) with a sulfidizing agent in an organic polar solvent;

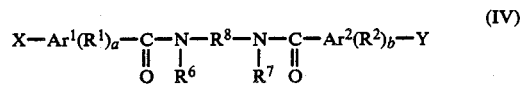
(IV)

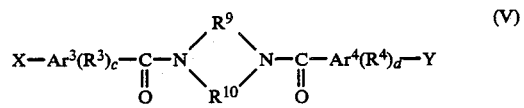
(V)

(VI)

wherein $Ar^1$, $Ar^2$, $Ar^3$, $Ar^4$ and $Ar^5$, which may be the same or different, each represent an aromatic ring; $R^1$, $R^2$, $R^3$, $R^4$, $R^5$, $R^6$ and $R^7$, which may be the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of $R^6$ and $R^7$ optionally being hydrogen; a, b, c, d and e, which may be the same or different, each represent an integer of from 0 to 4; $R^8$, $R^9$ and $R^{10}$, which may be the same or different, each represent an alkylene group having 1 to 20 carbon atoms; and X and Y, which may be the same or different, each represent a halogen; so as to form a polymer compound or compounds comprising the following repeating units (VII) and/or (VIII):

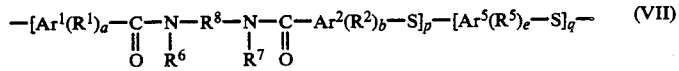  (VII)

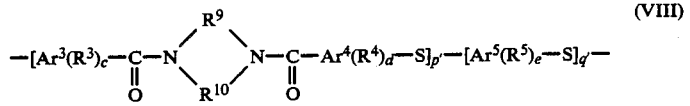  (VIII)

wherein $Ar^1$ through $Ar^5$, $R^1$ through $R^{10}$ and a, b, c, d and e are as defined above and each of the ratios of p/q and p'/q' ranges from 99/1 to 1/99.

BRIEF DESCRIPTION OF THE DRAWINGS

The accompanying

Figure 1:
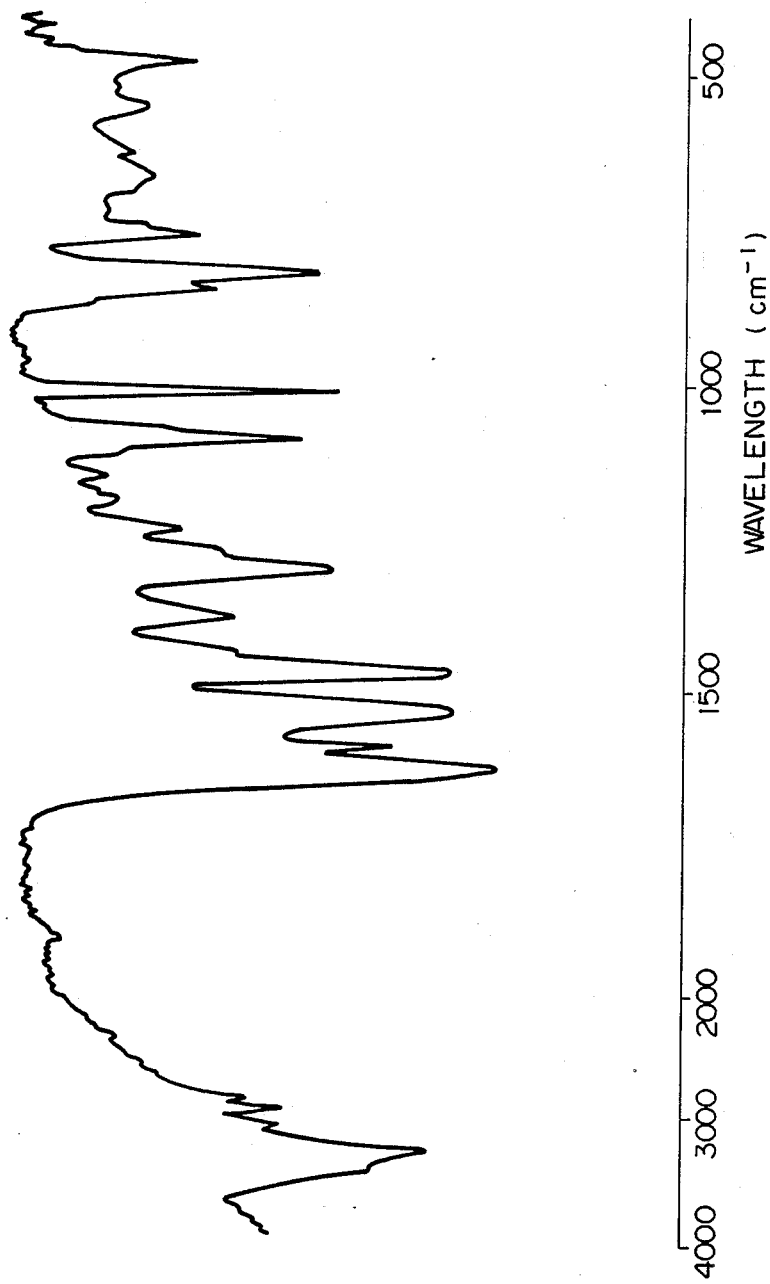
FIG. 1 shows an IR spectrum (wave length: about 400–4000 cm$^{-1}$) of the polymer obtained in Example 1.

The invention will now be described in more detail.

Examples of groups $Ar^1$, $Ar^2$, $Ar^3$, $Ar^4$ and $Ar^5$ in the aromatic dihalide compounds which may be used in the invention include:

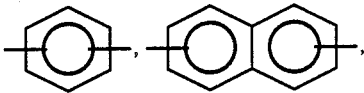

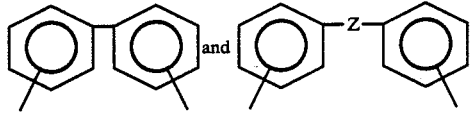

where Z represents —O—, —S—, —SO$_2$—, —CO—, —CH$_2$— or —C(CH$_3$)$_2$—. The groups may be the same or different in one compound.

Examples of particularly preferred dihalide compounds (IV) and (V) for use in the present invention include:

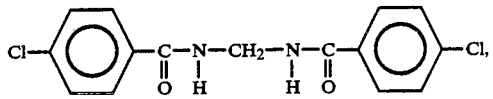

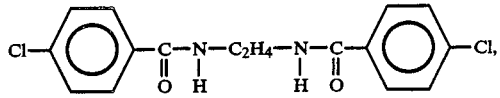

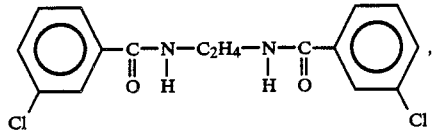

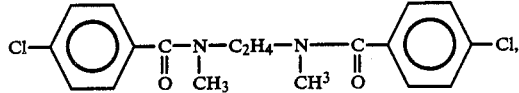

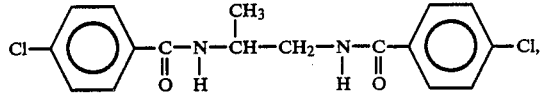

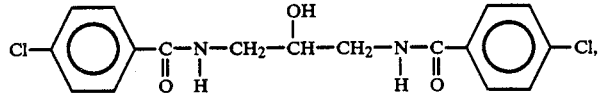

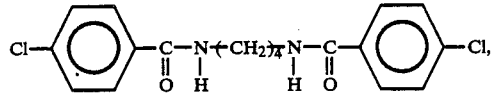

-continued
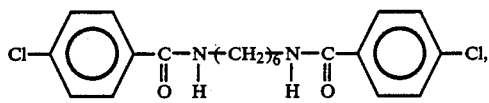
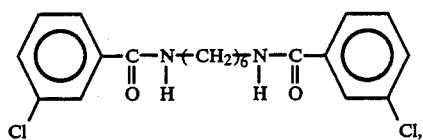
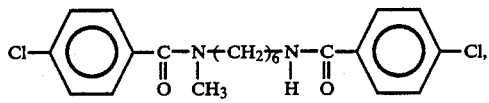
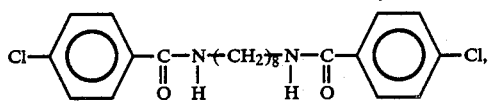
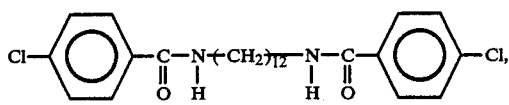
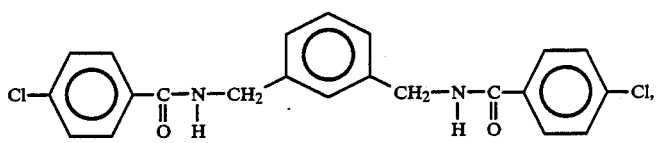
(cis or trans)
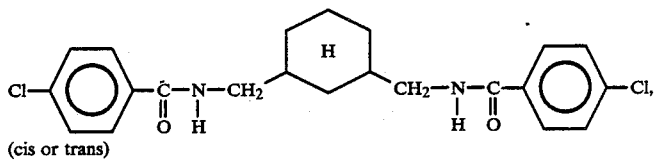
(cis or trans)
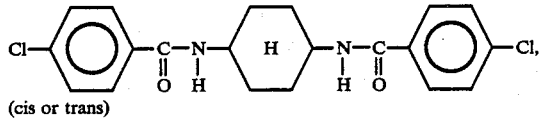
(cis or trans)
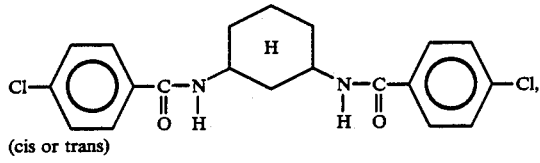
(cis or trans)
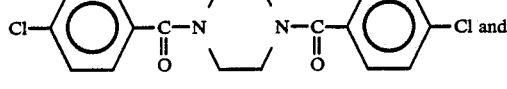

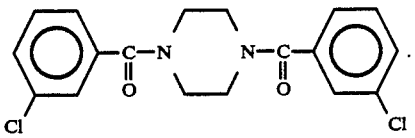

It is preferred that the amide group-containing dihalide compounds contain bonds at the para positions, if it is mainly desired to improve the thermal resistance properties of the product polymers. On the other hand, if it is desired to improve the solubility and molding properties of the sulfideamide polymer products, the dihalide compounds may contain bonds at the meta positions and/or at the ortho positions, or may be branched.

The amide group-containing dihalide compounds may be synthesized by the conventional amide linkage formation technique. A typical example of synthesis is a process in which a corresponding halogen-containing aromatic carbonyl chloride is reacted with a corresponding aliphatic diamine.

Examples of particularly preferred dihalide compounds (VI) which may be used in the invention include

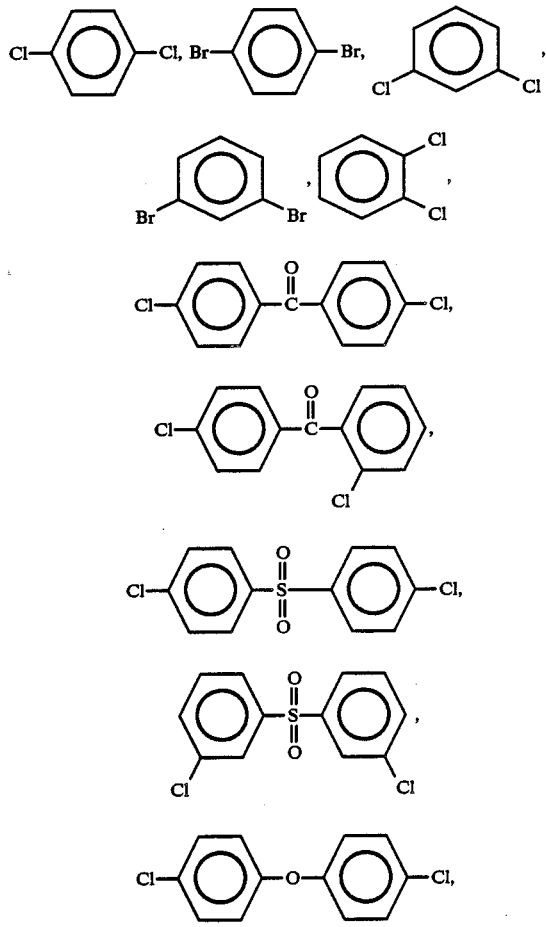

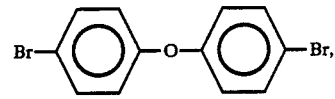

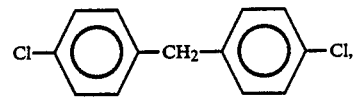

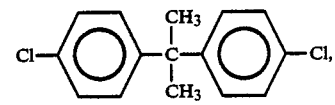

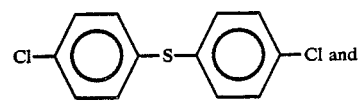

mixtures thereof.

Generally, the present process for production of aromatic sulfideamide polymers comprises sulfidizing the amide group-containing dihalide compound (IV) and/or (V) and the aromatic dihalide compound (VI) with a sulfidizing agent in an organic polar solvent. In practice of the process, for example, the amide group-containing compound (IV) and/or (V) and the other dihalide compound (VI) may be simultaneously sulfidized, or the amide group-containing compound (IV) and/or (V) and the other dihalide compound (VI) may be separately sulfidized and then brought together into a reaction system where they are allowed to further react with each other, or the amide group-containing compound (IV) and/or (V) may be first sulfidized in a reaction system and then the other dihalide compound (VI) being added together with an appropriate amount of additional sulfidizing agent to the system (or vice versa) for further reaction.

The organic polar solvents used in the process of the present invention are preferably aprotic ones and ones which are stable in the presence of alkalis at elevated temperatures. Examples of the preferred solvents include N,N-dimethyl acetamide (DMA), N-ethyl-2-pyrrolidone, hexamethyl phosphoric triamide (HMPA), dimethyl sulfoxide (DMSO), N-methyl-2-pyrrolidone (NMP), and 1,3-dimethyl imidazolidinone.

The sulfidizing agents which may be used in the process include alkali metal sulfides, combinations of hydrogen sulfide with alkali metal bases, and combinations of alkali metal hydrosulfides with alkali metal basis. The alkali metal sulfides and hydrosulfides may be used as hydrates (from 0.5 to 10 molar equivalents). The sulfidizing agents may be prepared in situ prior to introduction of the dihalide compounds of the general formulae (IV) and/or (V) and of (VI) into the reaction system. Of course, the sulfidizing agent may be prepared outside the reaction system and then introduced to the system.

It is preferred that, before the sulfidizing agent is introduced for commencement of the polymerization in the reaction system, the content of water in the system should be reduced to a level of less than 2.5 molar equivalents per equivalent of the sulfidizing agent to be introduced.

Among the available sulfidizing agents, sodium sulfide, sodium hydrosulfide in conjunction with sodium hydroxide, and hydrogen sulfide in conjunction with sodium hydroxide are preferred.

In the polymerization, a phase transfer catalyst such as a crown-ether compound, phosphor salt or an ammonium salt compound as well as an assistant such as an alkali metal carboxylate may be used to effectively increase the molecular weight of the resulting polymer.

The polymerization is effected at a temperature of about 150°–300° C., preferably 180°–280° C., for a period of about 0.5–24 hours, preferably 1–12 hours.

The preferred molar ratio of the dihalide compounds (IV), (V) and (VI) to the sulfidizing agent used in the present process ranges from 0.9:1.0 to 1.1:1.0.

The quantity of solvent used in the process may be such that the reaction system will contain 7–50%, preferably 10–40%, by weight of the product polymer upon completion of the polymerization.

The product polymer may be recovered by conventional methods, such as vacuum distillation, flash-off, and reprecipitation with organic solvents or water. The isolated product polymer may be washed with any suitable organic solvent or water and then dried.

Generally, the aromatic sulfideamide copolymers according to the present invention have a logarithmic viscosity in the range of 0.02 to 2.00, as measured at a concentration of 0.5 g/100 ml in concentrated sulfuric acid at a temperature of 30° C. or at a concentration of 0.1 g/100 ml in α-chloronaphthalene at 210° C. Polymers having viscosities of 0.05 to 2.00 are preferred.

The aromatic polysulfideamide polymers of the invention may be advantageously chain-extended and/or crosslinked and/or branched by heating in an oxidative atmosphere, such as air or oxygen-enriched air.

Where the polymers are molded or otherwise shaped, they may contain various filler materials. Examples of suitable filler materials include (a) fiber fillers, such as glass fibers, carbon fibers, boron fibers, aramid fibers, alumina fibers, etc. and (b) inorganic fillers, such as mica, talc, clay, graphite, carbon black, silica, asbestos, molybdenum disulfide, magnesium oxide, calcium oxide, etc.

As shown in the following Examples, the polymers of the present invention exhibit, on IR analysis, absorptions around 1090 cm$^{-1}$ (caused by thioether linkages), around 1640 cm$^{-1}$ (caused by carbonyl groups in amide linkages) and around 3320 cm$^{-1}$ and 1540 cm$^{-1}$ (both caused by amino groups in amide linkages). These IR data confirm that the present polymers have the structural repeating units (I) and/or (II) and units (III).

The invention is illustrated in detail but not limited by the following Examples.

Since most of the polymers according to the invention are only soluble in some special solvents such as concentrated sulfuric acid or α-chloronaphthalene, and are only sparingly soluble or insoluble in common organic solvents, it is not readily possible to determine the average molecular weight of the present polymers by a conventional method. Hence, the logarithmic viscosity value [η] of a polymer is herein employed as a measure of the molecular weight of that polymer. The logarithmic viscosity value [η] is obtained by measuring the relative viscosity of polymer dissolved in a concentrated sulfuric acid solvent at 30° C. and at a polymer concentration of 0.5 g/100 ml or the relative viscosity of polymer dissolved in α-chloronaphthalene at 210° C. and at a polymer concentration of 0.1 g/100 ml and calculating the result in accordance with the equation:

$$[\eta] = \ln \frac{(\text{relative viscosity})}{(\text{polymer concentration})}.$$

EXAMPLE 1

A 500 ml autoclave was charged with Na$_2$S.2.7H$_2$O (80 m moles) and N-methyl-2-pyrrolidone (NMP; 150 ml) and heated to a temperature of 200° C. with stirring so as to dehydrate the mixture. By this dehydration, 2.19 g of water containing 3.95% of NMP was distilled off. After cooling the reaction system down to 100° C., a dichloride

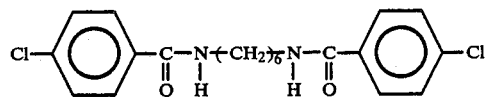

(60 m moles) and

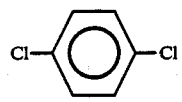

(20 m moles) were added together with an additional 50 ml of NMP. The system was shielded and heated to 250° C. At this temperature, the polymerization was allowed to proceed for 6 hours.

At the end of the polymerization period, the system was cooled and methanol was added to precipitate out the product polymer. The mixture was filtered. The filter cake was repeatedly washed with warm water and filtered and then washed with methanol and dried to give a light gray powdery polymer product (21.3 g; corresponding to a yield of 90.8%).

The infra-red absorption spectrum of the polymer showed absorptions at 1092 cm$^{-1}$ (thioether linkage) and 3400, 1622 and 1536 cm$^{-1}$ (amide linkage, respectively) (see FIG. 1).

Results of the elemental analysis, thermal analysis and solubility test are listed below:

Found (wt %): C 67.1, H 6.1, N 7.0, S 10.7; Theoretical (wt %): C 67.6, H 6.0, N 7.2, S 10.9.

The polymer showed a decomposition temperature of 437° C. but did not show a definite melting point.

The polymer was soluble in concentrated sulfuric acid but was sparingly soluble in an NMP/LiCl (95/5 by weight) mixture. It had a logarithmic viscosity of 0.14 (0.5 g/100 ml in H$_2$SO$_4$ at 30° C.).

EXAMPLE 2

A 500 ml autoclave was charged with Na$_2$S.2.7H$_2$O (58 m moles) and N-methyl-2-pyrrolidone (NMP; 150 ml) and heated to a temperature of 200° C. with stirring so as to dehydrate the mixture. By this dehydration 1.63 g of water containing 4.81% of NMP was distilled off. After cooling the reaction system down to 110° C., Cl—⟨phenyl⟩—Cl (60 m moles) was added together with an additional 50 ml of NMP. The system was shielded and heated to 250° C. At this temperature, the polymerization was allowed to proceed for 2 hours.

Similarly, a 1000 ml autoclave was charged with $Na_2S \cdot 2.7H_2O$ (182 m moles) and N-methyl-2-pyrrolidone (NMP; 300 ml) and heated to 200° C. with stirring so as to dehydrate the mixture. By this dehydration 5.34 g of water containing 3.76% of NMP was distilled off. Then the system was cooled down to 98° C. and, then, Cl—⟨phenyl⟩—C(=O)—N(H)—(CH$_2$)$_6$—N(H)—C(=O)—⟨phenyl⟩—Cl (180 m moles) was introduced together with the polymer slurry resulting from the first polymerization and an additional 100 ml of NMP into the polymerized slurry contained in the reactor. Then the reactor was again shielded and heated to 250° C. The mixture was allowed to react for a further 6 hours at this temperature.

At the end of the period, the system was cooled and methanol was added to precipitate out the product polymer. The mixture was filtered. The filter cake was repeatedly washed with warm water and filtered and then washed with methanol and dried to give a light gray powdery polymer product (64.9 g; 92.3% yield).

Results of the IR spectrometry, elemental analysis, thermal analysis, solubility test and logarithmic viscosity measurement are shown below:

IR: 1090 cm$^{-1}$ (thioether linkage), 3390; 1620; and 1538 cm$^{-1}$ (amide linkage).

Elemental analysis: Found (wt %): C 67.5, H 5.8, N 7.2, S 10.8; Theoretical (wt %): C 67.6, H 6.0, N 7.2, S 10.9.

The decomposition temperature was 467° C., with no definite melting point.

The polymer was soluble in concentrated sulfuric acid but sparingly soluble in NMP/LiCl (95/5 by weight). It had a logarithmic viscosity of 0.15 (0.5 g/100 ml in $H_2SO_4$ at 30° C.).

The polymer showed the properties except for the decomposition temperature similar to those of the polymer produced in Example 1. It is believed that significantly increased decomposition temperature of the polymer of Example 2 is due to its nature of block copolymer.

EXAMPLE 3

Polymerization was performed as described in Example 1 except that the dihalide compounds were substituted by:

Cl—⟨phenyl⟩—C(=O)—N⟨piperazine⟩N—C(=O)—⟨phenyl⟩—Cl (20 m moles) and

Cl—⟨phenyl⟩—Cl (60 m moles).

Yield: 12.4 g (97.2%).

IR: 1085 cm$^{-1}$ (thioether linkage), 1640 cm$^{-1}$ (carbonyl linkage).

Elemental analysis: Found (wt %): C 66.6, H 4.5, N 4.1, S 20.1; Theoretical (wt %): C 66.7, H 4.3, N 4.3, S 19.7.

The decomposition temperature was 427° C. and the melting point was found around 268° C.

The polymer was insoluble in an NMP/LiCl (95/5 by weight) mixture and slightly soluble in concentrated sulfuric acid.

The logarithmic viscosity was 0.13 (0.1 g/100 ml in α-chloronaphthalene at 210° C.).

EXAMPLE 4

The procedure of Example 1 was repeated except that the dihalide compounds were substituted by:

Cl—⟨phenyl⟩—C(=O)—N⟨piperazine⟩N—C(=O)—⟨phenyl⟩—Cl (50 m moles) and

Cl—⟨phenyl⟩—Cl (30 m moles).

Yield: 18.6 g (95.5%).

IR: 1084 cm$^{-1}$ (thioether linkage), 1640 cm$^{-1}$ (carbonyl linkage).

Elemental analysis: Found (wt %): C 67.3, H 5.0, N 7.6, S 10.9; Theoretical (wt %): C 67.5, H 4.9, N 7.5, S 11.4.

The decomposition temperature was observed at 452° C. and the melting point at 347° C.

The logarithmic viscosity was 0.15 (0.1 g/100 ml in α-chloronaphthalene at 210° C.).

As above shown, although the simple aromatic sulfideamide polymers alone are not melt-processable, the corresponding copolymers containing a comonomer component such as a dihalobenzene may have such a reduced melting point that they are melt processable.

EXAMPLE 5

The procedure of Example 1 was repeated except that the dihalide compounds were substituted by:

Cl—⟨phenyl⟩—C(=O)—N(H)—(CH$_2$)$_6$—N(H)—C(=O)—⟨phenyl⟩—Cl (30 m moles),

Cl—⟨phenyl⟩—C(=O)—N⟨piperazine⟩N—C(=O)—⟨phenyl⟩—Cl (30 m moles), and

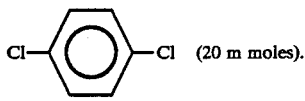 (20 m moles).

Yield: 21.9 g (97.8%).

IR: 1088 cm$^{-1}$ (thioether linkage), 3360; 1630; 1540 cm$^{-1}$ (amide linkage).

The decomposition temperature was 465° C. with no definite melting point observed.

The polymer was soluble in concentrated sulfuric acid, but sparingly soluble in an NMP/LiCl (95/5 by weight) mixture.

The polymer had a logarithmic viscosity of 0.16 (0.5 g/100 ml in H$_2$SO$_4$ at 30° C.).

From the above description, it will be appreciated that the present invention provides a novel class of aromatic sulfideamide copolymers which may be synthesized from readily commercially available materials by a simple procedure. It is expected that the novel copolymers a wide range of applications as engineering plastics because of their excellent heat resistance and processability properties and other useful properties.

What is claimed is:

1. An aromatic sulfideamide polymer which comprises from 1 to 99 mol % of repeating units represented by the following formula (I) and/or (II):

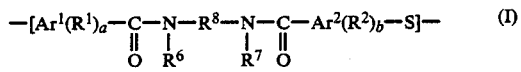 (I)

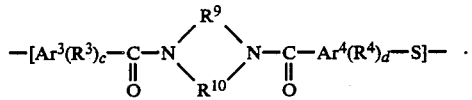 (II)

and from 99 to 1 mol % of repeating units represented by the formula (III):

 (III)

wherein Ar$^1$, Ar$^2$, Ar$^3$, Ar$^4$ and Ar$^5$, which may be the same or different, each represent an aromatic ring; R$^1$, R$^2$, R$^3$, R$^4$, R$^5$, R$^6$ and R$^7$, which may be the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of R$^6$ and R$^7$ optionally being hydrogen; a, b, c, d and e, which may be the same or different, each represent an integer of from 0 to 4; and R$^8$, R$^9$ and R$^{10}$, which may be the same or different, each represent an alkylene group having 1 to 20 carbon atoms, said polymer having a logarithmic viscosity [η] of 0.02 to 2.00, as determined by measuring the relative viscosity of polymer dissolved in a concentrated sulfuric acid solvent at 30° C. and at a polymer concentration of 0.5 g/100 ml or the relative viscosity of polymer dissolved in α-chloronaphthalene at 210° C. and at a polymer concentration of 0.1 g/100 ml and computing the result in accordance with the equation:

$$[\eta] = \ln \frac{\text{(relative viscosity)}}{\text{(polymer concentration)}}.$$

2. A polymer as claimed in claim 1 in which groups Ar$^1$, Ar$^2$, Ar$^3$, Ar$^4$ and Ar$^5$ are each selected from

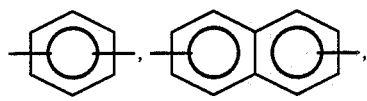

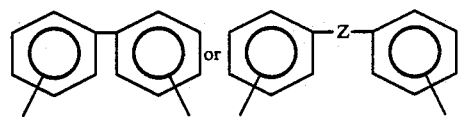

where Z represents —O—, —S—, —SO$_2$—, —CO—, —CH$_2$— or —C(CH$_3$)$_2$—.

3. A polymer as claimed in claim 1 in which the logarithmic viscosity is in the range of 0.05 to 2.00.

4. A polymer as claimed in claim 1 which has been cured by heating said polymer under an oxidative atmosphere.

5. A composition comprising an aromatic sulfideamide polymer as claimed in claim 1 and one or more additives selected from the group consisting of glass fibers, carbon fibers, boron fibers, aramid fibers, alumina fibers, mica, talc, clay, graphite, carbon black, silica, asbestos, molybdenum disulfide, magnesium oxide and calcium oxide.

* * * * *